IN-LINE PLURAL BEAM CATHODE RAY TUBE WITH AN ASPHERICAL APERTURE MASK

Original Filed Aug. 19, 1966 6 Sheets-Sheet 1

INVENTOR:
WILFRED D. RUBLACK,
BY Julius J. Zaskalicky
HIS ATTORNEY.

INVENTOR
WILFRED D. RUBLACK,

BY Julius J. Zaskalicky
HIS ATTORNEY.

TYPE-H BIRADIAL CONSTRUCTION

TYPE-V BIRADIAL CONSTRUCTION

INVENTOR:
WILFRED D. RUBLACK,
BY Julius J. Zaskalicky
HIS ATTORNEY.

INVENTOR:
WILFRED D. RUBLACK,
BY Julius J. Zaskalicky
HIS ATTORNEY.

INVENTOR:
WILFRED D. RUBLACK,
BY Julius J. Zaskalicky
HIS ATTORNEY.

INVENTOR:
WILFRED D. RUBLACK,

BY Julius J. Zaskalicky
HIS ATTORNEY.

United States Patent Office

Re. 27,259
Reissued Dec. 28, 1971

27,259

IN-LINE PLURAL BEAM CATHODE RAY TUBE WITH AN ASPHERICAL APERTURE MASK

Wilfred D. Rublack, De Witt, N.Y., assignor to General Electric Company

Original No. 3,435,268, dated Mar. 25, 1969, Ser. No. 573,604, Aug. 19, 1966. Application for reissue Apr. 1, 1970, Ser. No. 24,892

Int. Cl. H01j *29/02, 29/50*

U.S. Cl. 313—70 C 7 Claims

Matter enclosed in heavy brackets [ ] appears in the original patent but forms no part of this reissue specification; matter printed in italics indicates the additions made by reissue.

ABSTRACT OF THE DISCLOSURE

A plural beam cathode ray tube comprising a spherical screen including a plurality of phosphor dots arranged in rows, an aspherical mask adjacent the spherical screen and comprising a plurality of apertures arranged in rows, and a plurality of electron guns arranged in an in-line configuration parallel with the rows of the screen and the rows of the mask.

*This present application is for reissue of Patent No. 3,435,268, which issued on Mar. 25, 1969 on application Ser. No. 573,604, filed Aug. 19, 1966.*

The present invention is directed to plural beam cathode ray tubes suitable for use as color image display devices in color television systems and more particularly to trigun aperture mask tubes including three guns arranged in a line for producing three electron beams having their centers of deflection located substantially in a line on the central axis of the tube and parallel to the direction of horizontal scan of the beams thereof and an apertured mask for selectively directing each of the electron beams onto a screen coated with tricolor phosphor dots.

In such cathode ray tubes it is desirable for structural reasons to form the faceplate of the tube which supports the screen in the form of a curved surface with the concave side thereof facing the gun, preferably, such faceplate is a section of a sphere as such faceplates are easy to manufacture and to hold to desired tolerances. Preferably the phosphor dots provided on the concave surface of the faceplate are tangent dots or areas of substantially the same diameter arranged in a closely packed hexagonal array to provide maximum light from the tube. In a closely packed hexagonal array the phosphor areas are in rows substantially parallel to one another and parallel to the direction of horizontal scan of the beams of the tube and in columns substantially parallel to one another and parallel to the direction of vertical scan of the beams of the tube. The center of an area in one row and the centers of adjacent areas in an adjacent row forming the apices of an equilateral triangle. The phosphor areas in such a triangle are in essentially tangential relationship as are the phosphor areas in a row. Such triangular array of areas is referred to as a triad and such horizontal array of three successive areas is referred to as a triplet. Every third area in a row is provided with the same color phosphor. Adjacent rows of phosphor areas are arranged with respect to phosphor coating such that an area in one row having one kind of phosphor is adjacent to areas in an adjacent row, each having a respective other kind of phosphor. Typically red, green and blue phosphors are used.

In such a cathode ray tube the shape, size, and location of each of the apertures in respect to the centers of deflection of the three beams, each associated with a respective color phosphor, and in respect to a screen triplet determines the registration of the three images of the aperture cast by the three beams with respect to the selectively coated phosphor areas or dots on the screen.

Accordingly, an object of the present invention is to provide an improved plural beam cathode ray tube.

Another object of the present invention is to provide an improved plural beam cathode ray tube which provides maximum luminance from the screen area thereof.

Still another object of the present invention is to provide plural beam cathode ray tube for use in color television reception which is simple in structure and relatively easy to manufacture, yet which provides excellent performance.

Still another object of the present invention is to provide a plural beam cathode ray tube for use in color television reception which provides considerable flexibility in the proportioning thereof with respect to axial length and screen size with minimal compromise of such requirements as luminance and color purity.

A further object of the present invention is to provide in a plural beam cathode ray tube for color television reception having means for producing such beams in line and a screen with tangent phosphor dots in closely packed hexagonal array, an aperture mask which is simple in structure, easy to manufacture, yet which provides accurate registration of each of the images cast by an aperture by the beams with a respective phosphor dot on the screen over the entire area thereof.

In accordance with an illustrative embodiment of the invention there is provided, in a cathode ray tube having a gun for producing a center beam aligned on the center axis of the tube and a pair of side beams equally spaced horizontally from the center beam and a screen of the character indicated above, a mask which includes a multiplicity of apertures located in rows substantially parallel to the direction of horizontal scan of the electron beams and columns substantially parallel to the direction of vertical scan of the beams thereof. The spacing of the horizontal rows and vertical columns are uniform and is such that the center of an aperture in one row and the centers of adjacent rows form the apices of an equilateral triangle. The number of horizontal rows of apertures are equal in number to the number of horizontal rows of dots on the screen and the number of vertical columns of apertures are one-third the number of vertical columns of such dots. The three beams project six images onto the screen through a pair of adjacent apertures in a row in the central portion of the mask The center of the mask is spaced from the screen along the central axis of the tube such that the distance between the center of an image and an adjacent image is one-third the distance between the center of the image projected by the center beam through one of said apertures to the center of the image projected by the center beam through the other of said apertures. Each point of the mask is positioned in relation to a corresponding point on the screen which is the straight line projection of the center of deflection of the center beam through said point to said screen such that the three beams project three images of an aperture located in the vicinity of the point, the centers of which are equally spaced and one-third the distance between the centers of the images projected by the center beam through an adjacent aperture in a horizontal row in the vicinity of the point.

The novel features believed characteristic of the invention are set forth in the appended claims. The invention itself, together with further objects and advantages thereof may best be understood by reference to the accompanying drawings in which:

Figure 1A:
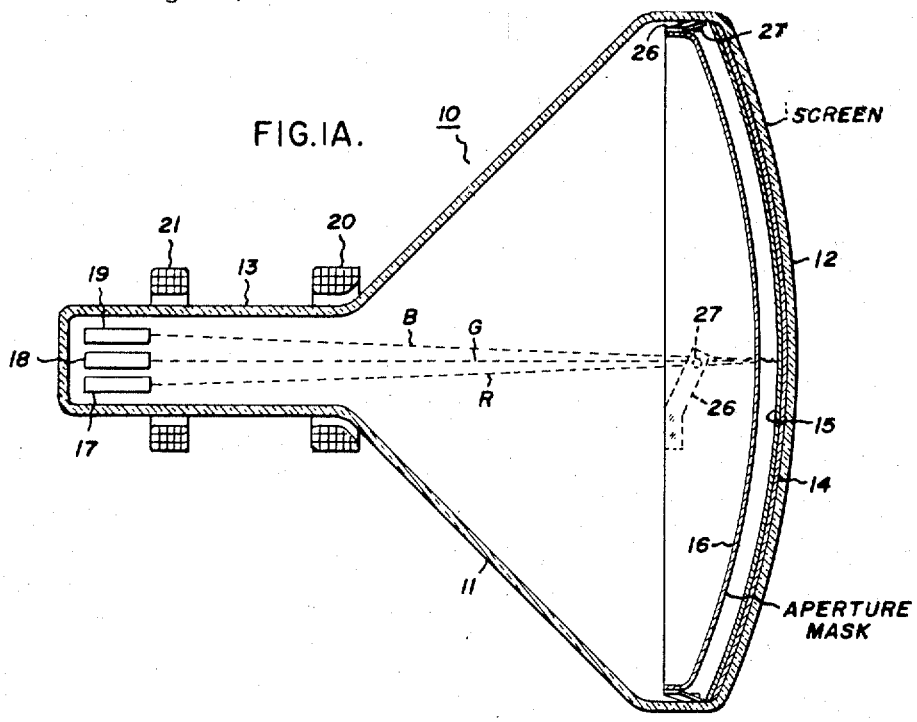
FIGURES 1A and 1B show plan and elevation views respectively, in section, of a trigun aperture mask cathode ray tube embodying the present invention.
Figure 1B:
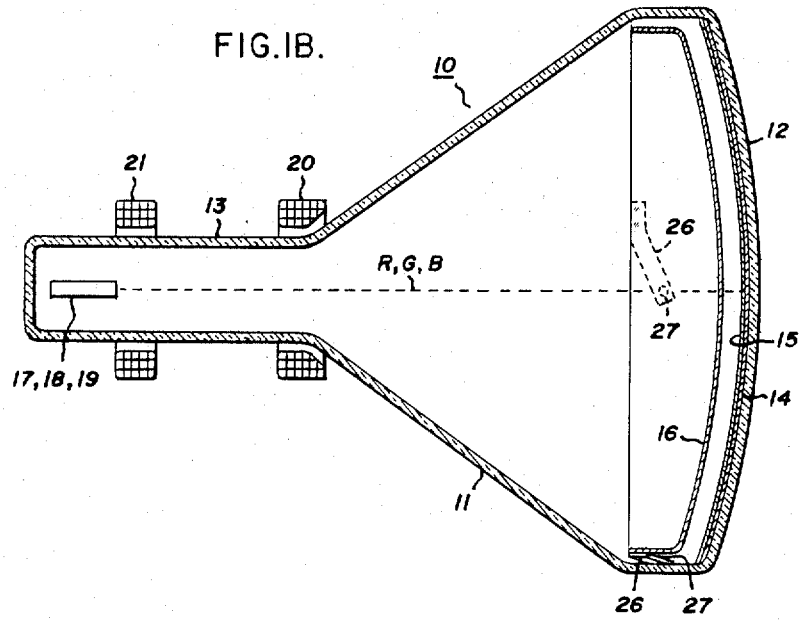

Referring now to FIGURES 1A and 1B there is shown , horizontal and vertical section of a plural beam cath-›de ray tube 10 suitable for color image display compris-ng a glass envelope 11 having a curved faceplate 12 at he enlarged end thereof and a reduced neck portion 13 :t the opposite end thereof. Enclosed within the tube on he concave surface of the curved faceplate 12 is an image creen 14 which has a multiplicity of sets or triplets of ›hosphor elements arranged in regular array. A metal ›acking plate 15 is also provided over the screen in ac-:ordance with usual practice in the art. Each of the sets ›f phosphor elements, referred to as a white element, in-:ludes a red phosphor element, a green phosphor element ınd a blue phosphor element arranged in that order on angent circular areas of equal diameter along horizon-al rows of the screen. Adjacent rows of elements are ar-anged such that the circular areas thereof are essen-ially tangent to one another thus forming an arrange-nent of phosphor elements commonly referred to as tan-;ent dots in a close packed hexagonal array. The nesting ›f the white elements is more particularly shown in FIG-JRE 2. It is desirable to make the areas in the form of :ircles of equal diameter to enable the concave surface ›f the faceplate 12 to be completely covered with phos-›hor dots whereby maximum light may be obtained there-rom with optimum excitation by electron beam energy.

A color selection electrode or mask 16 is included vithin the envelope 11. The mask 16 is positioned adja-:ent the screen 14 by means of three clips 26 each hav-ng a hole therein which fits into a respective pin 27 in he envelope. The mask 16 has a plurality of apertures herein related in configuration to the phosphor triplets uch that each aperture cooperates with a corresponding riplet. The shape and size of the apertures, the arrange-nent thereof on the mask, and the curvature of the mask n relation to the curvature of the faceplate will be more 'ully described below.

Electron gun means are provided in the neck portion ›f the envelope for projecting three electron beams hrough the color selection electrode 16 to the screen. The three beams designated R, G, and B, signifying the beams which excite the red, green and blue phosphors, respectively, are produced by three guns 17, 18 and 19 arranged in line in a horizontal plane extending through the central axis of the tube. The three beams are responsive to deflection fields produced by currents applied to the yoke 20 which cause the beam to scan the screen through the apertures in the mask at a relatively rapid rate horizontally and a relatively slow rate vertically to produce a raster on the screen. One form of yoke advantageously used in connection with the in-line gun structure of the tube shown is described and more fully claimed in a copending patent application Ser. No. 574,411, filed Aug. 23, 1966, and assigned to the assignee of the present invention.

A plane perpendicular to the central axis of the tube in the vicinity of the yoke 20 is conveniently considered the deflection center plane of the three electron beams and may be thought of as the source of the beams in considering the images of the apertures of the mask projected thereby on the screen. The green gun is located on the axis and the red and blue guns are each spaced the same distance from the gun in the aforementioned horizontal plane. If desired, the central axis location could also have been assigned to either the red or blue gun instead of the green gun. The guns are aimed by means (not shown) to converge on a common area on either the screen or the mask. The mask to screen separation is usually a very small fraction of the distance from the guns to the screen. Such convergence is referred to as static convergence. An additional convergence assembly 21 is also provided to effect dynamic convergence of the electron beams so as to cause the registration of the three beams on the same aperture over the complete scanning cycle. It will be recognized that such items as supporting structures for the guns, electrical connections to the guns, internal conductive coatings on the funnel portion of envelope 11 and the like have been omitted in FIGURES 1A and 1B for reasons of simplicity.

Figure 2:
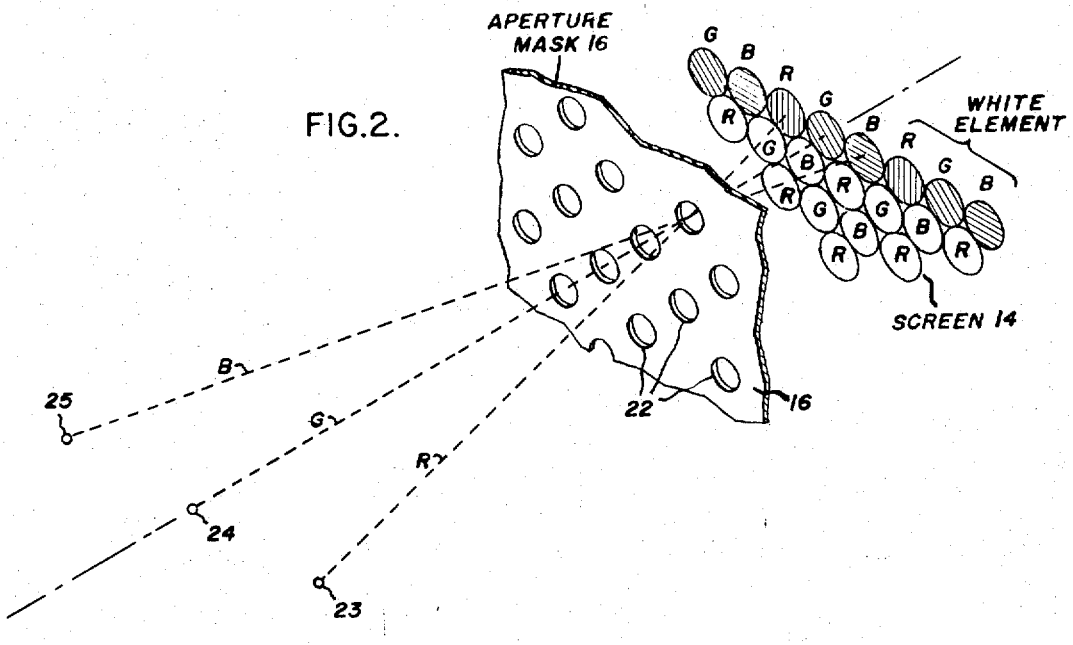
FIGURE 2 is a perspective view showing a central ection of the aperture mask of the tube of FIGURES .A and 1B about the central axis thereof particularly llustrating the manner in which each of the apertures se-ectively controls the location of the image projected ›y each of the three electron beams of the tube from the leflection centers thereof.

Referring now to FIGURE 2 there is shown a perspective representation of the linear white elements or triplets in the central portion of the screen 14, the apertures 22 in the mask 16 in the vicinity thereof, and the location of the deflection centers 23, 24, and 25 of the red, green and blue electron beams, respectively.

Circular areas of the triplets are the same diameter and are located in horizontal rows in tangent relationship with the centers of the areas in one row lying on a line parallel to the direction of horizontal scan of the beams. The rows of circles are closely packed such that a circle on one row is tangent to adjacent circles in adjacent rows. The areas are provided with light emitting phosphors, a red phosphor, a green phosphor and a blue phosphor, as indicated. Alternate rows are arranged such that phosphor elements of like color lie in parallel vertical columns. Such an array of phosphor dots is usually referred to as tangent dots in closely packed hexagonal array. The mask is provided with a multiplicity of circular apertures 22. The apertures are equal in number to the number of white elements on the screen 14. The apertures are arranged in horizontal rows and vertical columns. The number of horizontal rows equal the number of horizontal rows on the screen. The number of vertical columns is one-third the number of vertical columns of dots. With such an arrangement the dots fall into a hexagonal pattern in which the apertures are located on the apices and the center of a regular hexagon.

It should be recognized that the electron beams produced by the guns have a diameter of the order of the horizontal spacing of the apertures on the mask 16. The central aperture of the mask is aligned in a plane perpendicular to the axis of the tube such that the image cast by the green beam which lies on the central axis of the tube produces an electron image on a green phosphor dot also located at the center. As the separation of the deflection center of the green gun from the screen is greater than the separation of the aperture from the green gun the image cast by the aperture is larger than the aperture determined approximately by the relationship of the green deflection center to screen distance divided by the separation of the deflection center of the green gun from the mask. The exact relationship of image size as a function of the above mentioned variables would also include the beam diameter at the deflection center as is well known to those skilled in the art. Similarly, the red beam casts an image of the aperture onto the red phosphor area, and the blue beam casts an image of the same aperture on the blue area. The location of the mask on the axis between the deflection center plane and the screen is set so that the images cast by the red, blue and green beams are encompassed by the circular areas or dots and are preferably concentric therewith for a predetermined beam current. With convergence of the three beams maintained over the entire raster the images cast by the three beams through each of the apertures will be essentially circular even for the extreme angles of deflection in the horizontal and vertical planes about the center axis of the order of 45 degrees. However, the size and separation of said images will vary depending on the position of the aperture in a line between the deflection center of the green beam and the projection of the green beam through the aperture onto a point on the screen. It is desirable that the apertures be located in a position that will enable the three images cast by the three beams through an aperture to be of essentially the same diameter for a given electron beam diameter and have centers equally spaced over the entire screen of the tube thereby enabling the phosphor dots to be of substantially same diameter in closely packed hexagonal array on the screen. To maintain good color purity the image cast by a beam would be arranged to be smaller in diameter than the phosphor dot.

In accordance with one aspect of the present invention a mask is provided with apertures of circular outline and regular spacing but with readily developed curvatures in the horizontal and vertical planes and curvatures related to such curvatures over other planes through the central axis to enable such desired results to be achieved. The nature of such curvatures and the manner of forming such curvatures in the mask will be described below.

With an in-line configuration of the electron beam guns, aperture image projection on the screen is symmetrical when deflection center dynamics in response to horizontal and vertical deflection fields are well behaved as will be more fully described below. Proper electron beam illumination of close packed hexagonal array of tangent dots along both the horizontal or major and vertical or minor screen axes in such in-line gun arrangements is achieved by providing a mask having the proper curvature in horizontal and vertical planes through the central axis of the tube in conjunction with a screen of spherical curvature. Such curvatures in their simplest forms may be arcs of circles and such a mask configuration is referred to as biradial. The basic reason for such double curvature is that in the horizontal scan or sweep direction successive mask apertures view a projection of the color base, the distance between the center beam and a side beam in the plane of the centers of deflection, which becomes progressively smaller with increasing sweep angle while in the vertical scan or sweep direction successive apertures view the full color base independent of sweep angle. In the case of the two-dimensional delta configuration of electron beam guns of the prior art in which the guns are located at the apices of a triangle in a plane perpendicular to the central axis of the tube it is necessary to compromise the mask curvatures in the three directions defined by the delta configuration. Such compromise usually takes the form of a spherical mask of a radius chosen to distribute the errors in phosphor dot groupings over the tube face. Such compromise is not necessary with in-line guns utilizing the mask structure of the present invention. With such structure optimum phosphor dot packing of the screen in the form of tangent dots in closely packed hexagonal array as mentioned above and optimum electron beam illumination thereof even over extreme deflection angles can be achieved.

Before considering the manner of determining the radii of the aforementioned major or horizontal and minor or vertical arcs for the mask, it is advisable first to consider the geometry of the biradial mask as two distinct types can be generated which satisfy horizontal and vertical sweep requirements but which produce somewhat different mask to screen separation along a diagonal with respect to horizontal and vertical sweeps.

Figure 3A:
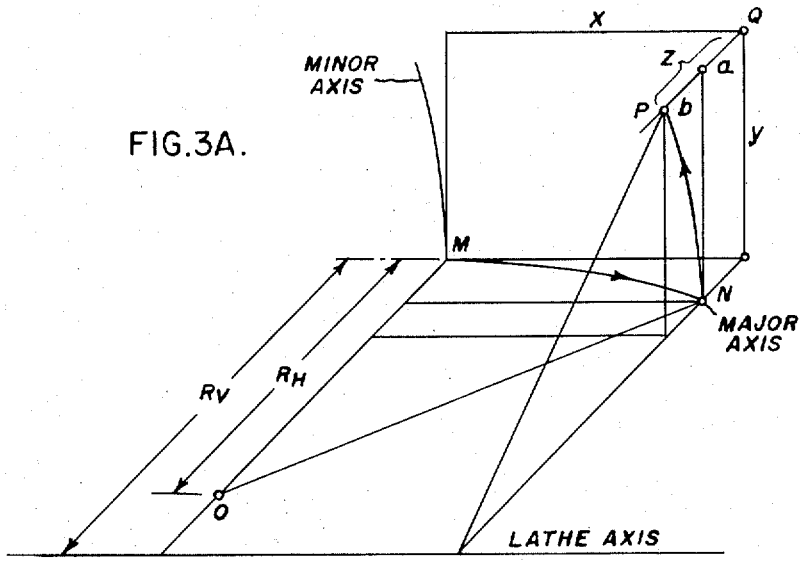
FIGURE 3A is an isometric drawing showing the man-ıer in which the contour of one form of die, useful in orming an aperture mask in accordance with the present nvention, may be generated.
Figure 3B:
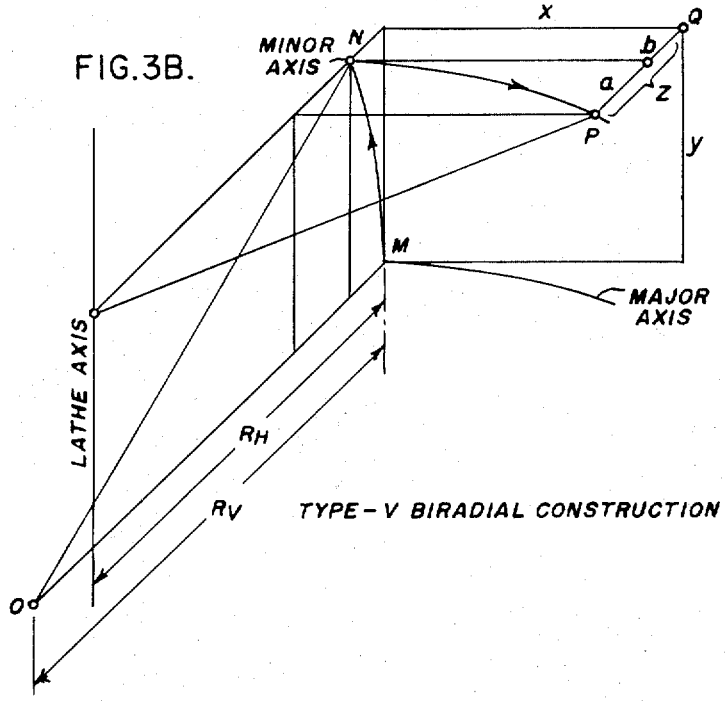
FIGURE 3B is an isometric drawing showing the man-ıer in which the contour of another form of die, useful n forming the contour of an aperture mask in accord-ınce with the present invention, may be generated.

A doming die having a biradial contour is easily generated on a lathe. One configuration referred to as the type-H configuration is shown in FIGURE 3A and another referred to as the type-V configuration is shown in FIGURE 3B. For reasons of consistency in these and subsequent figures the upper right quadrant of the mask surface as viewed from the base or gun region of the complete tube is shown. The lathe axis is horizontal in the type-H configuration, and vertical in the type-V configuration. Any point P on the mask surface will have coordinates x, y, z with respect to the mask center M. The coordinates x, y are shown on the quarter plane tangent to the mask center at M and normal to the central axis OM of the tube. The z coordinate is the offset QP normal to the tangent plane. The mask vertical radius (minor axis) is denoted by $R_V$, and the horizontal radius (major axis) by $R_H$. It will be seen in all cases that $R_V$ is greater than $R_H$.

Referring now to FIGURE 3A, the cutting tool is swung about point O of distance $R_H$ from point M and along the major axis from the mask center at M to the point N as the mask die is simultaneously rotated about the lathe axis. By inspection, $$a=R_H-\sqrt{R_H^2-x^2} \qquad (1)$$

Relative to the mask die as stationary, the tool describes an arc NP of radius $(R_V-a)$. That is, $$b=(R_V-a)-\sqrt{R_V-a)^2-y^2}$$

The offset at point P is $z=a+b$, $$z=R_V-\sqrt{(R_V-a)^2-y^2} \qquad (2)$$

For the minor axis $x=0$, so that $a=0$, or $$z\ \text{minor}=R_V-\sqrt{R_V^2-y^2} \qquad (3)$$

For the axis $y=0$, thus yielding $z=a$, or $$z\ \text{major}=R_H-\sqrt{R_H^2-x^2} \qquad (4)$$

Referring now to FIGURE 3B, the cutting tool is swung about point O of distance $R_V$ from point M along the arc MN of the minor axis as the mask die is rotated about the lathe axis shown oriented vertically. By inspection, $$b=R_V-\sqrt{R_V^2-y^2} \qquad (5)$$

Relative to the die as stationary the tool describes an arc NP of radius $(R_H-b)$.

That is, $$a=(R_H-b)-\sqrt{(R_H-b)^2-x^2}$$

The offset at P is $z=a+b$, $$z=R_H-\sqrt{(R_H-b)^2-x^2} \qquad (6)$$

For the minor axis $x=0$ yielding $z=b$, or $$z\ \text{minor}=R_V-\sqrt{R_V^2-y^2}$$

For the major axis $y=0$, so that $b=0$, or $$z\ \text{major}=R_H-\sqrt{R_H^2-x^2}$$

The configurations described in connection with FIGURES 3A and 3B produce contours that have somewhat different values for the offsets for points that do not lie on either the major axis or on the minor axis. Calculation of the mask to screen spacing desired along the screen diagonals would be necessary to choose the better configuration in critical cases. The type-H configuration is desirable where it is desirable not to restrict the critical major axis curvature to a simple circular arc. The type-V configuration may be used under circumstances where only lathes of minimal swing are available to form the dies for shaping the mask to the desired contour. It has been found that in diagonal or corner offsets in a mask of rectangular outline the differences between the two types of configurations were considerably less than the tolerance allowable on mask to screen spacing in the corners.

Figure 4A:
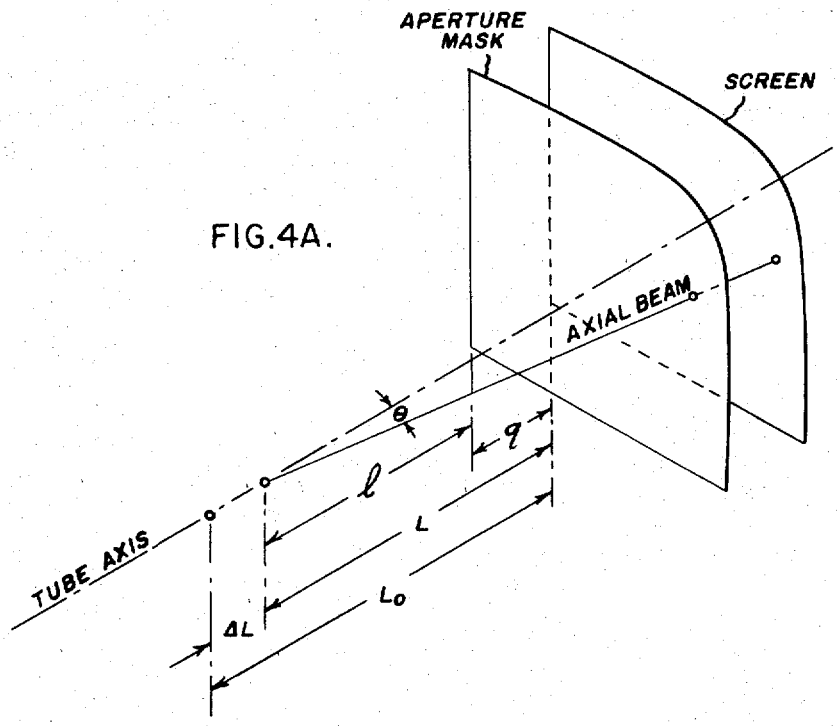
FIGURES 4A and 4B are two diagrams useful in ex-›laining the operation of the tube of FIGURES 1A and :B.
Figure 4B:
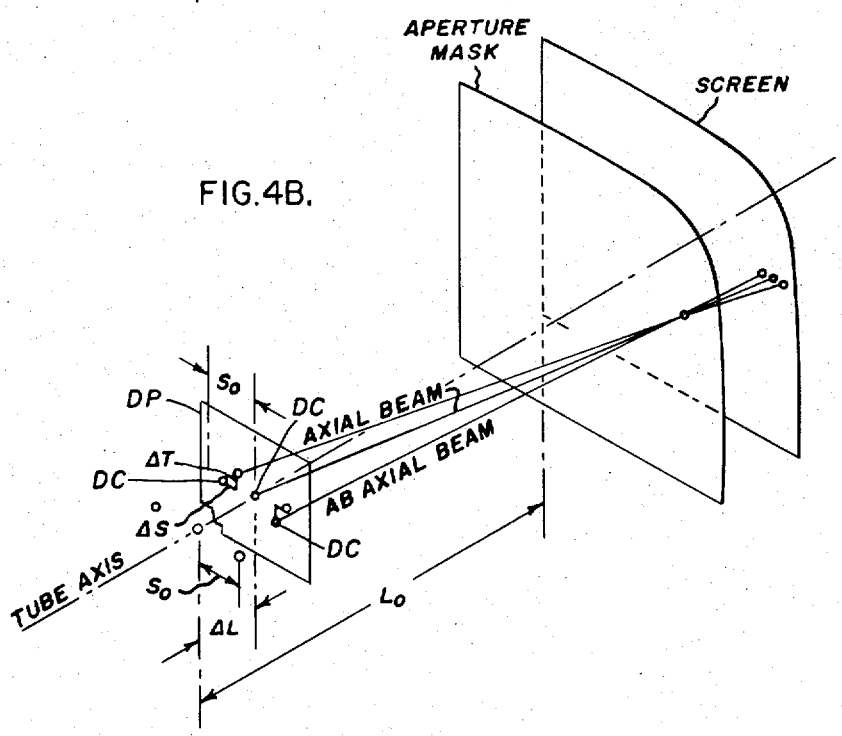

Before describing how the major and minor axis curvatures are determined, the convergence dynamics of inline guns will be described in connection with FIGURES 4A and 4B. The deflection center DC of the center or axial beam is defined as the location of the apparent source of the deflected beam on the tube axis as shown in FIGURE 4A. The deflection plane DP is the plane normal to the tube axis and containing the deflection center DC of the axial beam. The location of the DP is a dynamic quantity in that it is a function of the deflection angle. Its distance from the screen center is given by $$L=L_0-\Delta L \tag{7}$$

where $L_0$ is the DP distance for zero sweep angle $\theta$, and
$\Delta L$ is the forward motion with sweep angle $\theta$.

The quantity $L_0$ is physically indeterminate but can be obtained by suitable extrapolation of deflection data. It is convenient to also define the DP position with respect to the mask center by, $$l=l_0-\Delta L \tag{8}$$

where $$l_0=L_0-q \tag{9}$$

The quantity of q is the separation from the screen along the central axis of the tube.

Several choices are available for the definition of the DC for each abaxial or off axis beam. The deflection center will be defined as the apparent source of the deflected abaxial beam in the deflection plane of the axial beam. The color base is the quantity S measured horizontally from the tube axis as shown in FIGURE 4B. The color base is a dynamic quantity given by the relationships $$S=S_0-\Delta S \tag{10}$$

where $S_0$ is the color base for zero deflection. The deflection centers of the abaxial beams may have dynamic components $\Delta S$, and $\Delta T$ orthogonal to $\Delta S$, for compound sweep angles. A well behaved deflection system is one for which $\Delta S$ is symmetric for the two abaxial beams for deflection to any one point on the screen, and for which $\Delta T$'s are identically zero.

Figure 5A:
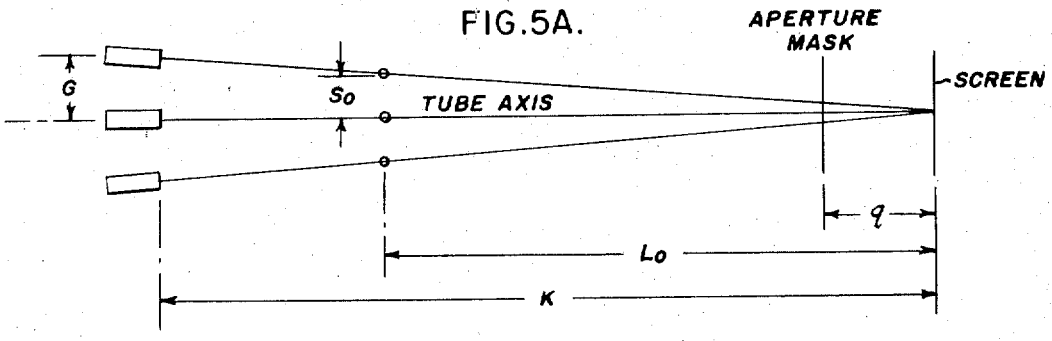
FIGURES 5A and 5B are diagrams useful in deriv-ng relationships for the center screen design for the tube ›f FIGURES 1A and 1B.
Figure 5B:
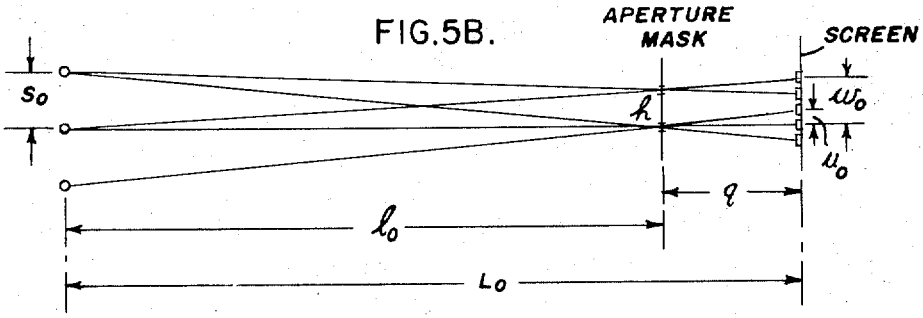

Referring now to FIGURES 5A and 5B, the design of the tube for the screen center will be described. Knowing the zero angle DP position $L_0$ for a given deflection yoke design and placement, the color base $S_0$ is determined from the gun base G, the distance between the axial beam and the abaxial beam sources in the horizontal plane of the guns, and the appropriate gun to screen separation K, as shown in FIGURE 5A, in accordance with the relationship, $$S_o=G\cdot\frac{L_o}{K} \tag{11}$$

Figure 6:
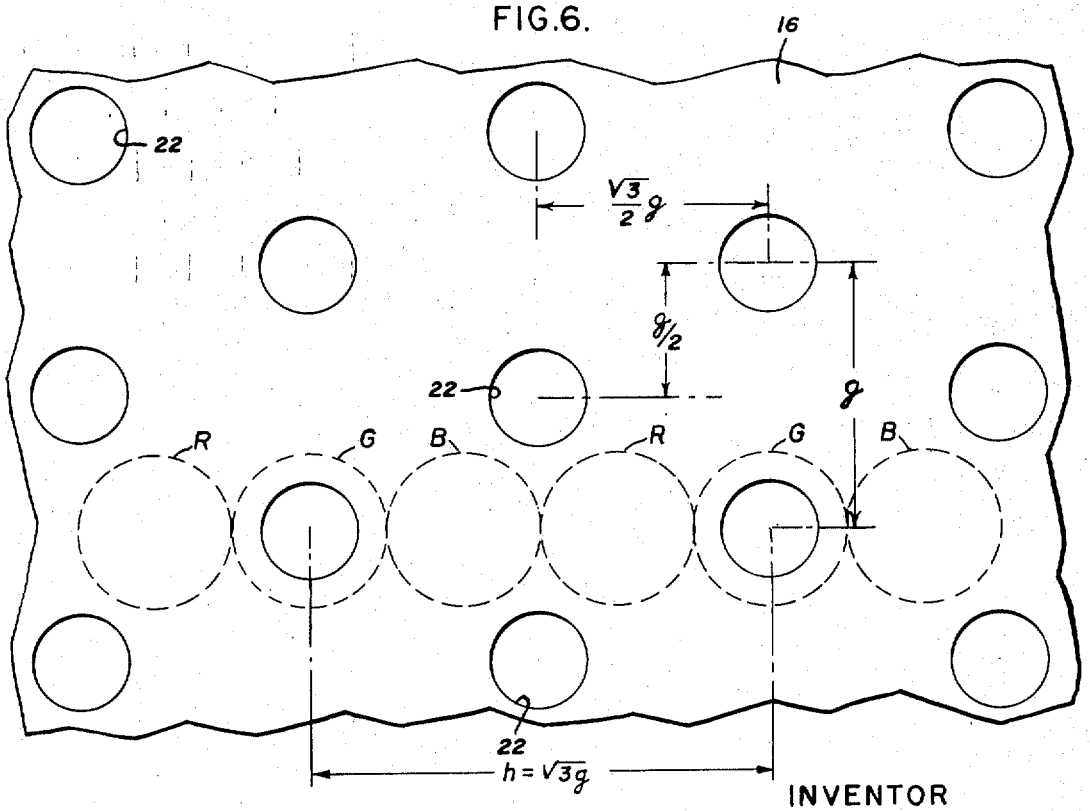
FIGURE 6 is a view of a section of the mask of FIG-JRE 1 along the central axis of the tube showing the nanner in which the apertures of the mask are spaced n relationship to one another.

The nearest neighbor aperture spacing in the hexagonal array of the mask, as shown in FIGURE 6, is g. The horizontal spacing is $$h=g\sqrt{3} \tag{12}$$

The horizontal triplet spacing $w_0$ is a simple magnification of the horizontal aperture spacing h. By inspection of FIGURE 5B $$w_o=\frac{h\cdot L_o}{(L_o-q)} \tag{13}$$

Similarly, the spacing between centers of the axial color dot and side color dots is $$w_o=\frac{S_o\cdot q}{L_o-q} \tag{14}$$

The mask to screen spacing is adjusted to yield tangent dots of equal size. This implies a screen center dot size $$u_o=\frac{w_o}{3}$$

The above relations then simplify to, $$q=\frac{hL_o}{3S_o} \tag{15}$$

The mask curvatures that provide the proper mask to screen separation along the major and minor axes to maintain the condition of tangent dots will now be described.

The equation for the vertical radius $R_V$ is derived first as it can be obtained in closed form for well behaved deflection and will also provide a good starting point for the determination of the horizontal radius $R_H$.

Figure 7:
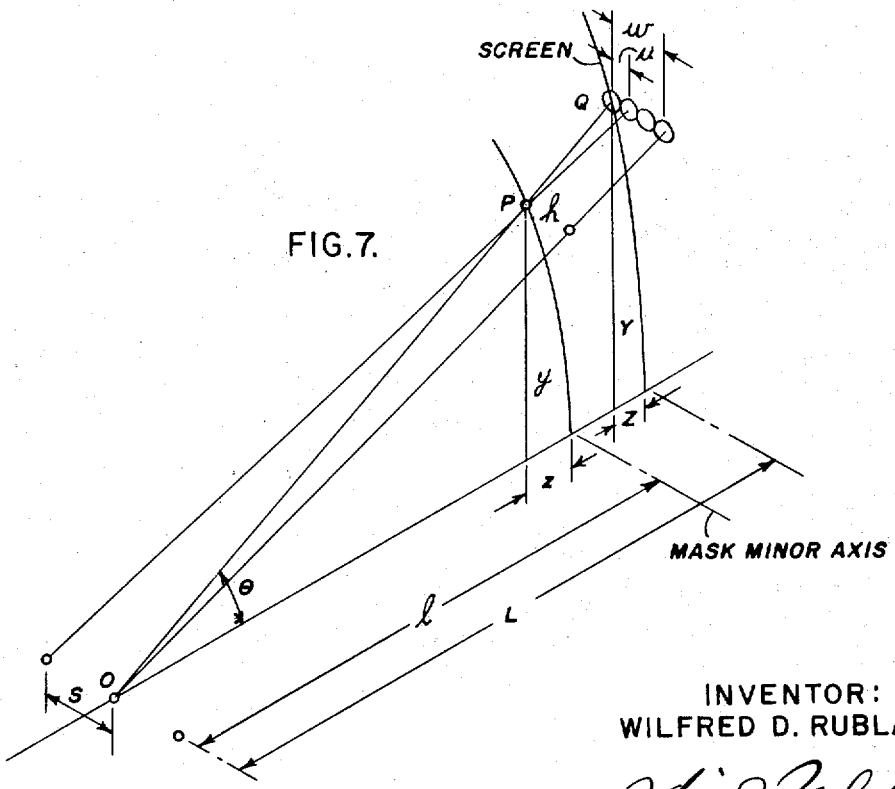
FIGURE 7 is a diagram useful in deriving the vertical ›r minor axis radius for the aperture mask of FIGURES .A and 1B.

Reference is now made to FIGURE 7. A vertical deflection angle $\theta$ for the axial beam is selected. The deflection plane distance L, and the color base S, can be obtained from the deflection-convergence data for the tube. The axial beam will intersect the mask at point P having the coordinate (y, z) and will intersect the screen at point Q having the coordinate (Y, Z). The mask surface in the small neighborhood of point P may be considered planar, and in fact, equivalent to the tangent plane at P. The same approximation is valid for the screen surface about point Q. Therefore, the horizontal triplet spacing w will be a simple magnification of the horizontal aperture spacing h.

$$w=M\cdot h \tag{16}$$

The magnification M is given by the ratio OQ/OP which is equivalent to the ratio Y/y. The magnification of the color base S projected through the aperture onto the screen is given by the ratio PQ/OP which is simply (M−1). The spacing u between the aperture images of the axial and abaxial beams is given by $$u=(M-1)S \tag{17}$$

It is necessary that w=3u to allow for the placement of tangent phosphor dots of equal size. Applying this constraint to Equations 16 and 17 yields the desired magnification, $$M=\frac{3S}{3S-h} \tag{18}$$

It is necessary to determine the vertical radius $R_V$ which will intersect the beam with the appropriate value of y to give the desired magnification. The desired value for y is, $$Y=\frac{Y}{M}=Y\frac{3S-h}{3S} \tag{19}$$

By inspection of FIGURE 7, we have $$Y=(L-Z)\tan\theta \tag{20}$$

and $$Z=R_S-\sqrt{R_S^2-Y^2} \tag{21}$$

Solving Equations 20 and 21 for Y yields, $$Y=\{\sqrt{R_S^2-R_S-L)^2}\sin^2\theta-(R_S-L)\cos\theta\}\sin\theta \tag{22}$$

The quantity y can now be calculated from the tube parameters and deflection data by applying Equations 19 and 22.

Again, by inspection, of FIGURE 7, we have, $$y=(l-z)\tan\theta \quad (23)$$

$$z=R_V-\sqrt{R_V^2-y^2} \quad (24)$$

Eliminating z and solving for $R_v$ yields, $$R_v=\frac{y^2+(l-y\cdot\mathrm{ctn}\,\theta)^2}{2(l-\cdot\mathrm{ctn}\,\theta)} \quad (25)$$

The value of M given by Equation 18 would yield the proper magnification to provide a two-dimensional array of hexagonally packed dots if the screen surface at Q were parallel to the mask tangent plane at P. The mask and screen surfaces are not quite concentric however. The intersection of the magnified dot array with the screen surface will produce a very small amount vertical separation betwen the horizontal rows of dots which may be ignored.

The solution for the horizontal radius $R_H$ cannot be obtained in closed form. It is necessary to first assume several likely values for $R_H$ and to calculate the spacing u and w for each of these for some horizontal deflection angle $\theta$. A graphical procedure is then used to determine the radius that yields w=3u. Many of the mathematical relations used will be similar to those used for the vertical radius with the exception that the coordinates x and X will replace the coordinates y and Y in the previous derivations.

Figure 8A:
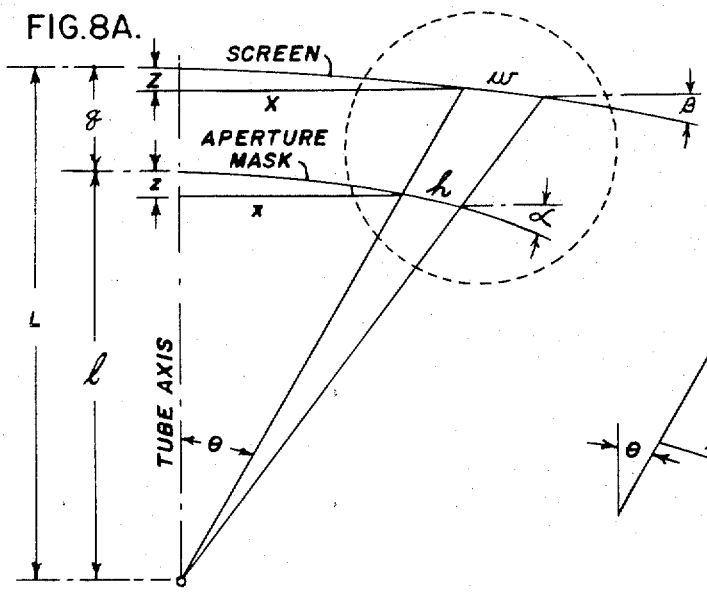
FIGURES 8A and 8B are diagrams useful for deriv-ng the major axis or horizontal radius of the aperture nask of FIGURES 1A and 1B.

A good first approximation is to take a range of values, $R_H \simeq 0.88R_V \pm 10\%$. For each value selected with reference to FIGURE 8a, $$x=\{\sqrt{R_H^2-(R_H^2-l)^2\sin^2\theta}-(R_H-l)\cos\theta\}\sin\theta \quad (26)$$

and $$X=\{\sqrt{R_S^2-(R_S-L)^2\sin^2\theta}-(R_S-L)\cos\theta\}\sin\theta \quad (27)$$

Figure 8B:
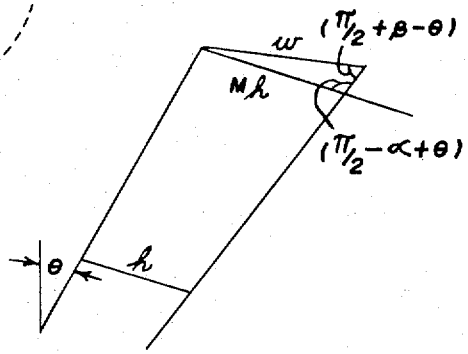

The triplet separation w on the screen will be a projection of the magnified aperture spacing Mh as shown in FIGURE 8B which is an enlargement of the portion shown in the dotted circle of FIGURE 8B. The magnification is now given by, $$M=X/x \quad (28)$$

The projection, as obtained by inspection of FIGURE 8B, is $$w=Mh\cdot\cos(\theta-\beta)/\cos(\theta-\alpha) \quad (29)$$

The values of $\alpha$ and $\beta$ for the major axis are determined from $$\sin\alpha=X/R_S \quad (30)$$

$$\sin\beta=x/R_H \quad (31)$$

Figure 9A:
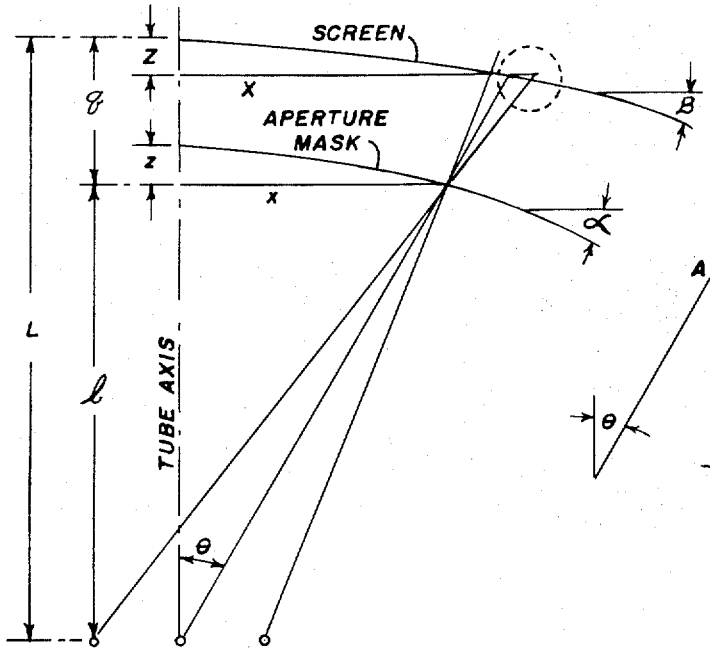
FIGURES 9A and 9B are additional diagrams useful n deriving the radius of the major or horizontal radius ›f the mask of FIGURES 1A and 1B.
Figure 9B:
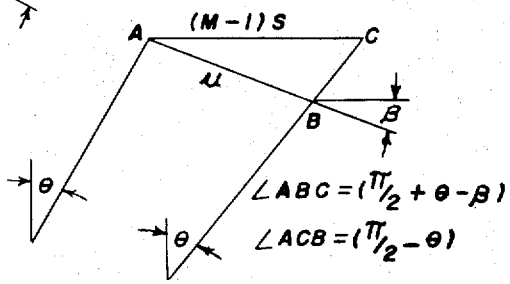

The magnification of the color base through the aperture to the screen is, as determined before, equal to M−1. The separation u of the aperture images of the axial and abaxial beams, as shown in FIGURES 9A and 9B which is an enlargement of the portion shown in the dotted circle of FIGURE 9B is a projection of the magnified color base given by $$\frac{u}{\sin\left(\frac{\pi}{2}-\theta\right)}=\sin\frac{(M-1)S}{\left(\frac{\pi}{2}+\theta-\beta\right)}$$

$$u=(M-1)S\cdot\cos\theta/\cos(\theta-\beta) \quad (32)$$

The value of u and w are calculated for each radius selected. The separation of the adjacent dots of the two abaxial beams given by the relationship $$v=w-2u \quad (33)$$

is also computed. Both quantities u and v are then plotted as a function of the horizontal radius $R_H$. The intersection of the two lines which occurs for u=v will indicate the proper radius for which w=3v. The effect of observed distortions of well behaved deflection dynamics do not alter the basic requirement of a biradial contour but play a second order role in modifying the curvatures required for an optimum solution.

It has been found that aperture masks having a major axis radius and a minor axis radius determined as described above and curvatures of other regions of the mask determined as described in connection with FIGURES 3A and 3B provide a mask structure yielding excellent concentric registration of each beam landing on a respective dot on a screen provided with a closely packed hexagonal array of tangent dots. It has been found that the concentricity of the beam landings over the central portion of the mask is less sensitive to tube parameter variations than over other regions on the screen, particularly the edge regions thereof. In view of such a situation less guard band, i.e., the band existing between the aperture image and the outline of the phosphor dot does not need to be as great for center areas of the screen as for areas remote therefrom to provide the desired degree of color purity. Accordingly, the circular apertures in the center region of the mask may be larger than the regions more remote therefrom. With a mask structure such as described above it has been found that the image diameters, assuming constant beam diameter measured in the deflection plane and assuming constant aperture diameter, near the edges of the screen do not vary more than a few percent than over the image diameters projected by the beams in the center of the screen thus enabling the tangent dots on the screen to be closely packed maximizing phosphor coverage of the screen area.

While the mask in accordance with the invention has been described in which a circular arc is provided for the major axis thereof it will be appreciated that the optimum radii determined for various deflection angles may be determined and a compromise radius used which minimizes beam landing errors. Also the portions of arcs corresponding to such radii may be matched by a curve other than a circle. The doming die for a mask having such a curve in the major axis may be formed by the technique described in connection with FIGURE 3A where the cutting tool instead of being swung about the point O is programmed to move along the path of such curve.

Also, while determinations of major and minor axis curves for the mask as well as for other points thereto have been made for the combination in which the screen is spherical in contour it will be readily understood that the technique of such determinations could be applied to screens of other than spherical contour. In such a case points on the screen would be defined by offsets, i.e., Z coordinates, from a plane normal to the central axis of the tube at the intersection with the screen, and corresponding offsets determined for each such screen offset in accordance with the technique described herein. Such offsets would then be used to form a doming die for the mask.

While the invention has been described in connection with a cathode ray tube having three electron beams in line in a horizontal plane, it will be appreciated that the invention may be applied in connection with tubes having other than three beams in line, for example, two beams in line. It will also be appreciated that the electron beams may lie in a plane other than the horizontal plane, and accordingly the radius of the arc of the mask in that plane would correspond to major axis referred to in the derivations above. It will further be appreciated that other modifications may be made by those skilled in the art, and I intend by the appended claims to cover all such modifications and changes as fall within the true spirit and scope of the invention.

What I claim as new and desire to secure by Letters 'atent of the United States is:

1. In combination in a cathode ray tube having a central xis:

a curved screen normal to said central axis at the center thereof, electron gun means for projecting a center beam and a pair of side beams toward the concave side of said screen, said beams being arranged to image on a common area of said screen in the absence of deflection fields applied thereto and to provide deflection centers lying in a line generally perpendicular to said central axis, the deflection center of said center beam lying on said central axis and the deflection center of each of said side beams spaced an equal distance from the deflection center of said center beam, *and* an aspherical *biradial* mask located adjacent said screen with the concave surface thereof facing said electron gun means and having a multiplicity of apertures therein, the center of said apertures lying in rows substantially parallel to said line, a row of centers being equally spaced from an adjacent row of centers, each aperture of said mask positioned in relation to a corresponding point on said screen which is the straight line projection of the center of deflection of said center beam through said aperture to said screen such that each of said beams projects an image of said aperture, the spacing between the centers of adjacent images projected by the center and side beams through said aperture being one-third the distance between the centers of the images projected by said center beam through said aperture and through an adjacent aperture in the same row.

2. The combination of claim 1 in which said curved creen is substantially a segment of a sphere having its enter lying on said central axis, said mask having a first urve defined by the intersection of said mask by a plane hrough said central axis and including said line, and a econd curve defined by the intersection of said mask by plane through said central axis and perpendicular to said ine, said curves differing from each other and being symnetrical about said central axis, the maximum radius of urvature of said first curve differing from the maximum adius of curvature of said second curve.

3. The combination of claim 2 in which said curves are ubstantially arcs of circles.

4. The combination of claim 3 wherein the intersecion of a first plane defined by said central axis and said ine with said mask defining a first arc of a circle of radius $R_H$, the intersection of a second plane including said central axis and perpendicular to said line with said mask defining a second arc of a circle of radius $R_V$ the section of a plane parallel to said second plane and including a point on said mask defining an arc of a circle the radius of which is $R_V$ diminished by the normal distance from said point to plane tangent to said mask at the intersection of said first and said second arcs.

5. The combination of claim 3 wherein the intersection of a first plane defined by said central axis and said line with said mask defining a first arc of a circle of radius $R_H$, the intersection of a second plane including said central axis and perpendicular to said line with said mask defining a second arc of a circle of radius $R_V$, the section of a plane parallel to said first plane and including a point on said mask defining an arc of a circle the radius of which is $R_H$ diminished by the normal distance from said point to plane tangent to said mask at the intersection of said first and said second arcs.

6. In a plural beam cathode ray tube of the aperture mask type, the combination of a curved screen normal to the central axis at the center thereof, electron gun means projecting a plurality of beams, the deflection centers of which lie substantially on a line orthogonal to said central axis, a curved mask with a plurality of apertures therein and having one axis lying in a plane including said central axis and said line and another axis lying in a plane including said central axis and perpendicular to said line, the relative curvatures of said mask and said screen producing a mask to screen spacing at one point on said one axis different from the mask to screen spacing at another point on said other axis where said one point and said other point are equidistant from said central axis.

7. The combination of claim 6 wherein said plurality of beams comprises a center beam coinciding with said central axis and a pair of side beams.

References Cited

The following references, cited by the Examiner, are of record in the patented file of this patent or the original patent.

UNITED STATES PATENTS

| | | | |
|---|---|---|---|
| 2,887,598 | 5/1959 | Benway | 313—70 |
| 3,109,116 | 10/1963 | Epstein et al. | 313—85 |
| 2,745,978 | 5/1956 | Van Ormer | 313—92 X |

ROY LAKE, Primary Examiner

V. LAFRANCHI, Assistant Examiner